United States Patent [19]

Retallick

[11] Patent Number: 4,677,839
[45] Date of Patent: Jul. 7, 1987

[54] APPARATUS FOR SHAPING A SPIRAL CATALYST SUPPORT

[75] Inventor: William B. Retallick, West Chester, Pa.

[73] Assignee: Camet, Inc., Hiram, Ohio

[21] Appl. No.: 844,607

[22] Filed: Mar. 27, 1986

Related U.S. Application Data

[62] Division of Ser. No. 763,975, Aug. 9, 1985, Pat. No. 4,598,063.

[51] Int. Cl.$^4$ ................ B21J 13/00; B21D 53/84
[52] U.S. Cl. ........................... 72/402; 72/394; 72/404; 100/232; 100/264
[58] Field of Search ............... 72/398, 402, 394, 396, 72/406, 370, 404; 29/157 R; 100/232, 237, 264

[56] References Cited

U.S. PATENT DOCUMENTS

| | | | |
|---|---|---|---|
| 1,710,979 | 4/1929 | Herbener | 100/232 |
| 1,758,798 | 5/1930 | Lopez | 100/264 |
| 3,159,876 | 12/1964 | Hall | 100/232 |
| 3,485,081 | 12/1969 | Kocks | 72/406 |
| 3,535,907 | 10/1970 | Winter | 72/398 |
| 3,763,688 | 10/1973 | Cuq | 72/402 |
| 3,911,720 | 10/1975 | Kocks | 72/406 |
| 4,178,790 | 12/1979 | Buckley et al. | 72/402 |

FOREIGN PATENT DOCUMENTS

| | | | |
|---|---|---|---|
| 971277 | 1/1951 | France | 72/398 |
| 67867 | 3/1958 | France | 72/398 |
| 726257 | 11/1966 | Italy | 72/402 |
| 1679 | of 1888 | United Kingdom | 72/398 |

*Primary Examiner*—Daniel C. Crane
*Attorney, Agent, or Firm*—William H. Eilberg

[57] ABSTRACT

A spiral-wound metal catalyst support is disclosed, wherein the layers of the spiral cannot telescope outwardly in either direction. The support is formed by first winding together a flat strip and a corrugated strip, the strips being wound on a mandrel. The mandrel is removed to leave an axial hole. The catalyst support is then flattened at each end, so as to close the axial hole at each end. The flattening is done in mutually perpendicular directions, so that the catalyst support has tapers in both of two directions. The tapers prevent telescoping of the layers of the support. The catalyst support can be placed in a tube before it is flattened, and then the tube and the support can be flattened together, so that the support becomes firmly anchored in the tube. In an alternative embodiment, a second, tapered mandrel is inserted into the support before flattening, the tapered mandrel having a shape conforming to the inner cavity defined by the flattened support. The support is thereby anchored on the tapered mandrel, further preventing the layers of the support from telescoping. The invention also includes a method of making the catalyst support.

7 Claims, 18 Drawing Figures

APPARATUS FOR SHAPING A SPIRAL CATALYST SUPPORT

This is a division of application Ser. No. 763,975, filed Aug. 9, 1985, now U.S. Pat. No. 4,598,063, issued July 1, 1986.

BACKGROUND OF THE INVENTION

The present invention relates to the field of catalyst supports, especially for use in catalytic converters for automobiles. The catalyst support of the present invention is of the type which is known as a "honeycomb", because the support has a cross-section which resembles a honeycomb. The terms "honeycomb" and "catalyst support" are used interchangeably herein.

Catalyst supports having a spiral shape have been known in the prior art. The spiral structure is simple to build, but it has suffered from a major disadvantage which has limited its use for catalytic converters. This disadvantage is that the spiral supports of the prior art telescope outwardly, due to the pulsating exhaust of the automobile.

In Paper No. 850131 of the Society of Automotive Engineers (SAE), the production of a metal catalyst support having a "racetrack" cross section is described. By "racetrack" is meant the shape which is obtained when a circle is divided along a diameter, and the resulting semicircles are separated by a distance of about one radius, the semicircles being connected by tangents. This shape is commonly used for catalytic converters for automobiles. In the cited SAE paper, a flat strip and a corrugated strip are wound together on a mandrel, and then the mandrel is removed. The catalyst support is flattened in a press to convert the cylindrical cross section into a racetrack. The round hole in the center becomes a straight line seam parallel to the flat sides of the racetrack.

So far, the only known way to prevent telescoping has been to braze together the layers of the spiral over a short length at each end of the spiral. For example, the cited SAE paper states that the layers of the catalyst support must be brazed to prevent the support from telescoping. While brazing does prevent telescoping, it is expensive, and it also restricts the choice of metal for the spiral to those metals that can be brazed. Such metals are not the best catalyst supports.

The present invention provides a structure which prevents telescoping of the layers of a spiral catalyst support. The invention does not require brazing of the metal, so that any metal can be used. The invention also includes a method of making a metal spiral-shaped catalyst support.

SUMMARY OF THE INVENTION

The catalyst support of the present invention is formed by first winding together a pair of metal strips, one flat and one corrugated. Alternatively, two corrugated strips can be wound together, if the strips have mutually inclined corrugations, so that the strips cannot nest together. The catalyst support can also be made by winding a single strip upon itself when the strip has cylindrical indentations that maintain the spacing between the layers. This construction is shown in U.S. Pat. Nos. 4,162,993 and 4,301,039, wherein the strip or strips are wound together on a mandrel, and the mandrel is then removed to leave an axial hole.

The resulting structure, after being inserted into a cylindrical tube or shell, is flattened at each end, so as to close completely the axial hole at each end, and to provide a continuously tapered catalyst support. The flattening is done in different directions at the two ends. In the preferred embodiment, the flattening at one end is done in a direction perpendicular to that of the flattening at the other end. The seams formed by the flattened axial holes are therefore perpendicular to each other. The tapers in the support insure that the layers of the spiral cannot telescope outwardly in either direction.

In another embodiment, the honeycomb catalyst support can be flattened at only one end. This flattening also produces tapers in both of two directions, and also prevents telescoping of the layers of the support.

While it is preferable to flatten the support after it has been inserted into the tube, it is also possible to fit a preformed tube, having indentations which conform to the shape of the tapered catalyst support, around the support, after the support has been flattened. With either method of construction, the resulting catalyst support is firmly anchored in the tube.

In still another embodiment, the support is flattened over a tapered mandrel. The tapered mandrel is shaped to conform substantially to the shape of the cavity defined by the support. The tapered mandrel is permanently fixed within the final product, thereby firmly anchoring the support on the tapered mandrel, and further preventing telescoping of the layers.

It is therefore an object of the present invention to provide a spiral wound metal catalyst support which cannot telescope outwardly.

It is another object of the invention to provide a simple solution to the problem of telescoping in spiral wound catalytic converters for automobiles.

It is another object of the invention to provide a support as described above, wherein the support has two continuous tapers in both of two directions.

It is another object of the invention to provide a support as described above, wherein the support is flattened at only one end.

It is another object of the invention to provide supports as described above, wherein the layers of the support do not need to be brazed, and wherein any metal can be used to construct the support.

It is another object of the invention to provide support having the advantages described above, and wherein the support provides a plurality of unobstructed channels for gas flow.

It is another object of the invention to provide support which is formed over a mandrel having a shape which generally conforms to the shape of the interior cavity of the flattened support.

It is another object to provide an economical method of making a spiral-shaped metal catalyst support which does not telescope outwardly.

Other objects and advantages of the invention will be apparent to those skilled in the art, from a reading of the following brief description of the drawings, the detailed description of the invention, and the appended claims.

BRIEF DESCRIPTION OF THE DRAWINGS

FIG. 7B is a cross sectional view of the mandrel, taken along the line 7B—7B of FIG. 7A.

FIGS. 7C and 7D are end view of the mandrel shown in FIG. 7A, taken at the left hand side and at the right hand side of FIG. 7A, respectively.

DETAILED DESCRIPTION OF THE INVENTION

The catalyst support of the present invention is made by first winding a flat metal strip and a corrugated metal strip to form a spiral-shaped structure. The strips are wound together on a mandrel, which is removed after the winding, to leave an axial hole. Alternatively, two corrugated strips can be wound together, when the strips have mutually inclined corrugations, so that the corrugations do not nest together. The catalyst support can also be made by winding a single strip upon itself when the strip has cylindrical indentations that maintain the spacing between the layers. This construction is shown in U.S. Pat Nos. 4,162,993 and 4,301,039, the disclosures of which are incorporated by reference herein. The resulting structure is illustrated in the end view of FIG. 2, which shows honeycomb 20 having axial hole 21. Honeycomb 20 of FIG. 2 becomes honeycomb 10 of FIG. 1, after being flattened.

Figure 2:
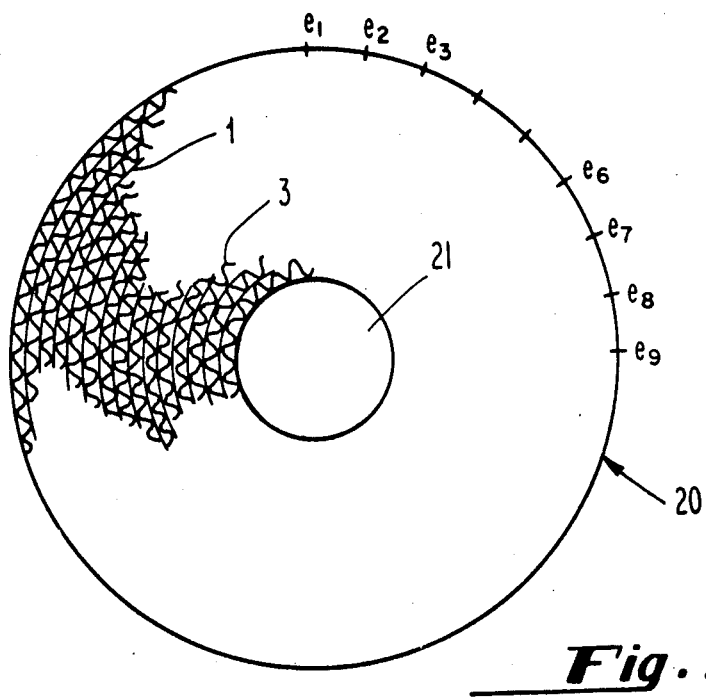
FIG. 2 is an end view of a metal catalyst support before it has been flattened, also showing the layers in fragmentary form.

FIG. 2 also shows some of the layers of flat and corrugated strips which define the honeycomb. Flat strip 1 and corrugated strip 3 are visible. The layers are shown, in the figures, in fragmentary form only.

Figure 1:
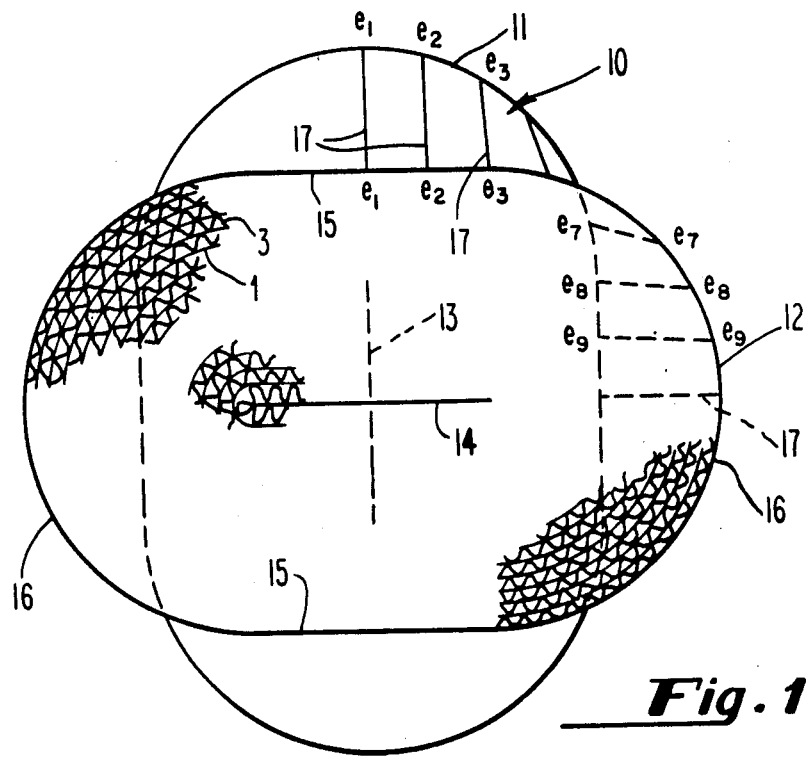
FIG. 1 is an end view of the metal catalyst support of the present invention, the support having been flattened at both ends to form tapers in two directions. The layers of the support are shown in fragmentary form.

The spiral catalyst support of FIG. 2 is to be flattened at both ends. The flattening is done in mutually perpendicular directions, although what is important is that the flattening be done in directions which are non-parallel. The resulting support is illustrated in FIG. 1. FIG. 1 is an end view of a honeycomb catalyst support 10 which has been flattened at both ends. The support 10 has a racetrack cross section at each end, as indicated by racetracks 11 and 12. The axes of the racetracks 11 and 12 are at right angles to each other. Seams 13 and 14, on each end of honeycomb 10, are formed by the closing off of the axial hole, such as is shown by reference numeral 21 in FIG. 2, during the flattening process. The flat strip 1 and corrugated strip 3 are still visible in FIG. 1. Although the shape of the cross-section has changed, the separation between adjacent layers is maintained.

The seams 13 and 14 both have a length of $(\pi)/2$ times d, where d is the diameter of axial hole 21 of FIG. 2. The long axis of the racetrack cross sections 11 and 12 has a length equal to $D+((\pi/2)-1)d$, where D is the diameter of honeycomb 20. The distance $((\pi/2)-1)d$ is just the difference between one half the circumference of axial hole 21, and the diameter of that hole. The short axes of the racetracks have a length equal to $D-d$. The difference between the long and the short axes is $D+((\pi/2)-1)d-[D-d]=(\pi/2)d$. This is the amount of taper that exists over the length of the honeycomb, in both of two directions. This is the maximum obtainable taper, and it occurs when the axial hole is completely flattened, and when the flattening at one end is done in a direction perpendicular to that of the flattening at the other end.

The perimeter of the racetracks 11 and 12 is equal to the circumference of the two semicircles plus the length of the two straight segments 15. The perimeter of the racetracks must also be equal to $(\pi)D$, i.e. the circumference of the original cylindrical honeycomb. If semicircles 16 are true semicircles, so that their lengths total $2(\pi/2)(D-d)$, then since the total perimeter is $(\pi)D$, the sum of the lengths of the straight segments 15 must be $$(\pi)D - 2(\pi/2)(D-d) = 2(\pi/2)d.$$

This result is just twice the length of seams 13 or 14, and shows that the flattened portion of the honeycomb is coextensive with the length of the seam.

When the cylinder is flattened to make the racetrack, neither the outer layer nor any other layer within the spiral has to be stretched. This is a necessary condition because, while a corrugated strip could be stretched slightly, an uncorrugated, flat strip could not be stretched at all.

The points $e_1, e_2, e_3, \ldots, e_g$ in FIG. 2 represent arbitrary points on the edge of cylinder 20. Line segments 17, of FIG. 1, are formed by joining the corresponding points $e_i$ on both edges of the cylinder. The line segments all lie entirely on the surface of the catalyst support, both before and after the flattening is done. The individual line segments 17 are all straight, but collectively they define the curved surface indicated in FIG. 1.

Figure 3:
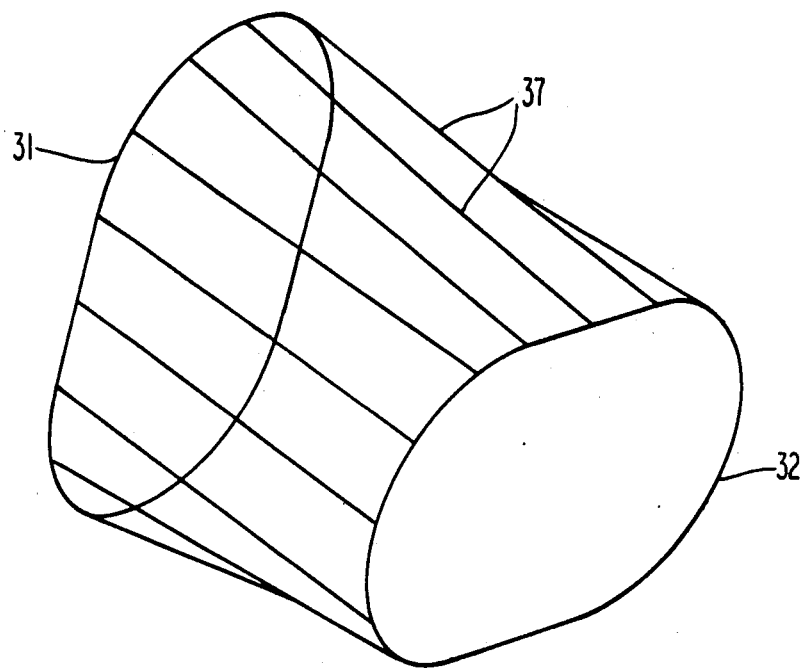
FIG. 3 is a perspective view of the catalyst support shown in FIG. 1.

FIG. 3 is a perspective view of the catalyst support shown in the end view of FIG. 1. Racetrack 31 is the far face and racetrack 32 is the near face. Line segments 37 correspond to line segments 17 of FIG. 1. These line segments all lie entirely on the surface of the catalyst support. The individual line segments 17 and 37 are all straight, but collectively they define the curved surface indicated in FIGS. 1 and 3. It is important that the line segments be straight lines, because then the spacing between the adjacent layers is maintained at every point. All of the channels in the support remain unobstructed after the flattening.

Figure 4:
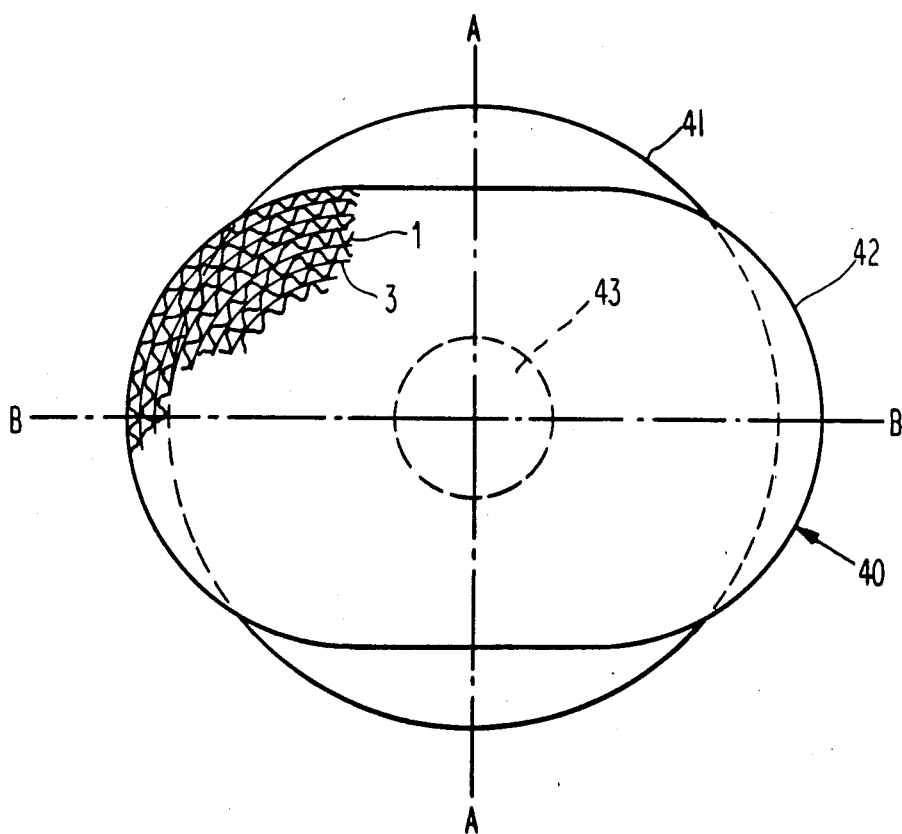
FIG. 4 is an end view of a catalyst support that has been flattened at one end only, and showing the layers of the support in fragmentary form.

FIG. 4 is an end view of a tapered honeycomb catalyst support 40 that is made from the same cylindrical structure as that shown in FIG. 2, but wherein only the near end has been flattened. The near face 42 has the same shape as the racetrack 12 in FIG. 1. The far face 41 is the original circle of FIG. 2. Flat and corrugated strips 1 and 3 are also visible, as in FIG. 1. Hole 21 of FIG. 2 survives as round hole 43 in face 41, and as a flat seam which lies along the line BB 44 in face 42. Line AA lies in the far face 41, as seen in FIG. 4, and line BB lies in the near face. Line AA thus is coincident with the diameter of hole 43, which is equal to d, and line BB is coincident with the flat seam which has a length of $((\pi/2)-1)d$. The tapers run in opposite directions, as in FIG. 1. The taper in FIG. 4 is less than that of the support of FIG. 1, so that the support of FIG. 1 givees more positive resistance to telecsoping. Here, again, the elements of the curved surface are straight lines so that all of the channels remain unobstructed.

When the spiral catalyst support is flattened to form the seams, it is possible for gas to leak through a slight opening in the seam and thereby bypass the catalyst. This leakage can be prevented by placing some packing in the axial hole before the flattening is done. An alternative embodiment, discussed below, solves this problem in another way, by including a tapered mandrel which occupies substantially all the space within the interior cavity of the support.

Figure 5A:
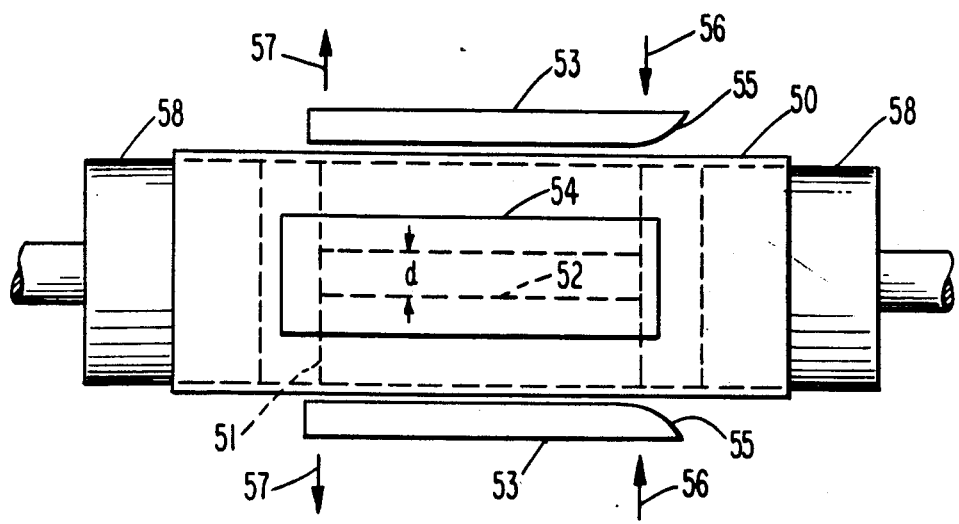
FIG. 5A is a side elevational view of the apparatus used in the method of making the catalyst support of the present invention.
Figure 5B:
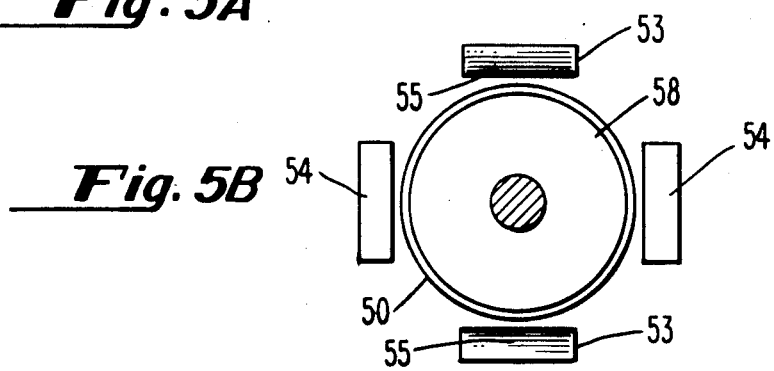
FIG. 5B is an end view of the apparatus shown in FIG. 5A.

FIGS. 5A, 5B, 5C, 5D, 5E, and 5F show a method and apparatus for flattening a tube or canister that contains a cylindrical catalyst support. FIG. 5A shows a tube 50 that contains a cylindrical honeycomb 51 having an axial hole 52. The diameter of this hole is d, the same dimension indicated for the hole in FIG. 2. Cylindrical mandrels 58 are inserted into both ends of tube 50 to prevent the ends of the tube from flattening. The flattening is done by plates 53 and 54, there being a total of four such plates, spaced at 90° intervals around the circumference of tube 50. This arrangement is shown in the end view of FIG. 5B. Each plate has a curved lip at one end, indicated by reference numeral 55 on plates 53. The curved lips on plates 54 are at the ends opposite to the lips on plates 53.

To do the flattening, the curved ends of plates 53 and 54 close together by the distance d, the diameter of hole 52. Plates 53 close so as to flatten the honeycomb at the right hand side of FIG. 5A, while plates 54 close so as to flatten the honeycomb at the left hand side of the same figure. The motion of plates 53 is indicated by arrows 56. The non-curved ends of plates 53 move apart, by the distance $((\pi/2)-1)d$, as indicated by the arrows 57, due to the simultaneous compression of the honeycomb by plates 54, at the left hand side of the figure. Similar arrows could be drawn, perpendicular to the plane of the drawings, to represent the movement of plates 54.

In the method described above, both sides of the honeycomb catalyst support are flattened at once. It is also possible to flatten only one side at a time. The simultaneous flattenings illustrated in FIG. 5A are preferable, because of the saving of time of manufacture.

Figure 5C:
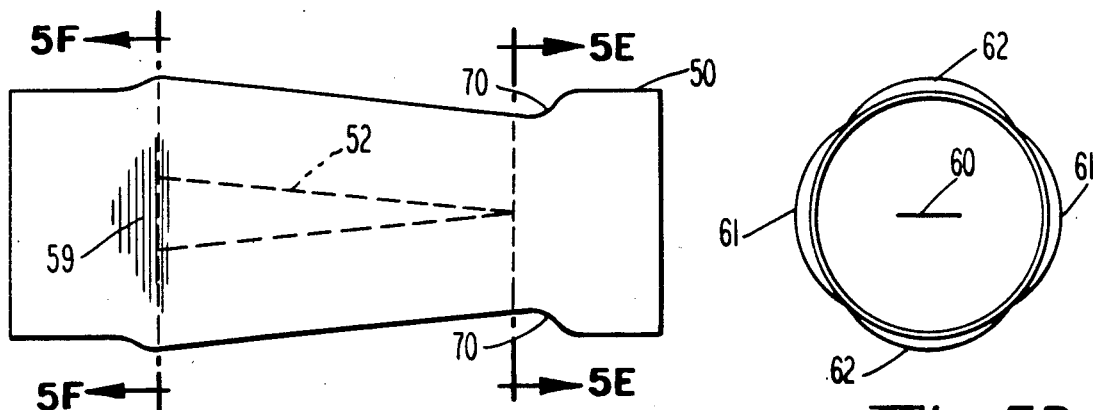
FIG. 5C is a side elevational view of the catalyst support.
Figure 5D:
FIG. 5D is an end view of the catalyst support shown in FIG. 5C.

FIG. 5C is a side elevational view, showing the result of the flattening operation. The mandrels have been removed, but the ends of tube 50 remain circular. Tube 50 has been flattened so that it tapers in both of two directions. The taper toward the right terminates in the curved surfaces indicated at 70, formed by the curved lips 55 on plates 53. The taper toward the left terminates in the curved surface indicated by the shading lines 59, formed by the curved lips on plates 54. The axial hole 52 has been flattened into a straight line seam at both ends. The seam is indicated at 60 in the end view of FIG. 5D. Also shown in the end view are the semicircular end of the racetrack 61 formed at the right hand end of the taper, as shown in FIG. 5C, and the semicircular end of the racetrack 62 formed at the left hand end of the taper.

Figure 5F:
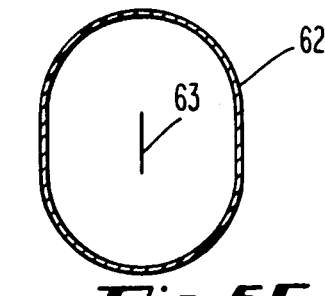
FIG. 5F is a cross-sectional view taken along the line 5F—5F of FIG. 5C.
Figure 5E:
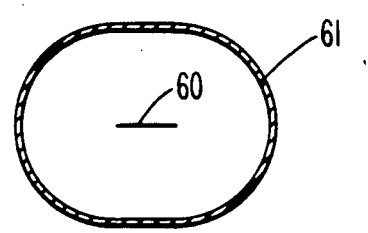
FIG. 5E is a cross-sectional view taken along the line 5E—5E of FIG. 5C.

FIG. 5E is a cross-sectional view taken along the line 5E—5E of FIG. 5C. This section has the shape of racetrack 61. Likewise, FIG. 5F is a cross-sectional view taken along the line 5F—5F of FIG. 5C, and has the shape of racetrack 62. The flat seam formed by flattening the left hand end of hole 52, as shown in FIG. 5C, is indicated by reference numeral 63.

The catalyst support shown in FIG. 5C is the finished product. It may be attached to the automobile by joining the circular end portions directly to the tailpipe, or through the use of a conventional cone or adapter for matching of diameters.

It is also possible to construct the catalyst support by flattening the wound honeycomb, and then attaching a metal shell which has been previously shaped to conform to the honeycomb. The shell could be formed in two or more pieces, the pieces being welded together when the shell is fitted over the honeycomb. However, the method described above, wherein the honeycomb is first inserted into the cylindrical shell, and wherein the entire structure is flattened at once, is preferable.

When the flattening is done as shown in FIGS. 5A through 5F, the metal of the tube 50 is stretched at the curved surfaces 70 and 59, so that the tube and the honeycomb cannot spring back to their original shape.

In FIG. 5A, tube 50 is shown as a straight cylinder. Tube 50 could be replaced by a canister having ends that taper down to the smaller diameter of the exhaust pipe. This canister could be formed from clamshell halves that are clamped around the honeycomb and welded together. The cylindrical mandrels 58 would be replaced by circular clamps around the outside of the canister. The purpose of the clamps is the same, namely to prevent the ends of the canister from flattening.

An additional feature can be added which more positively prevents telescoping of the layers of the support. When the honeycomb is flattened at each end, a cavity is formed in the core of the honeycomb. Before the honeycomb is flattened, a tapered mandrel is inserted into the round hole left by the mandrel upon which the honeycomb was originally wound. This tapered mandrel has the shape of the cavity that will be formed when the honeycomb is flattened. The tapered mandrel extends beyond the honeycomb at both ends of the honeycomb, and is secured at both ends to tube 50, or to whatever canister is used.

Figure 6A:
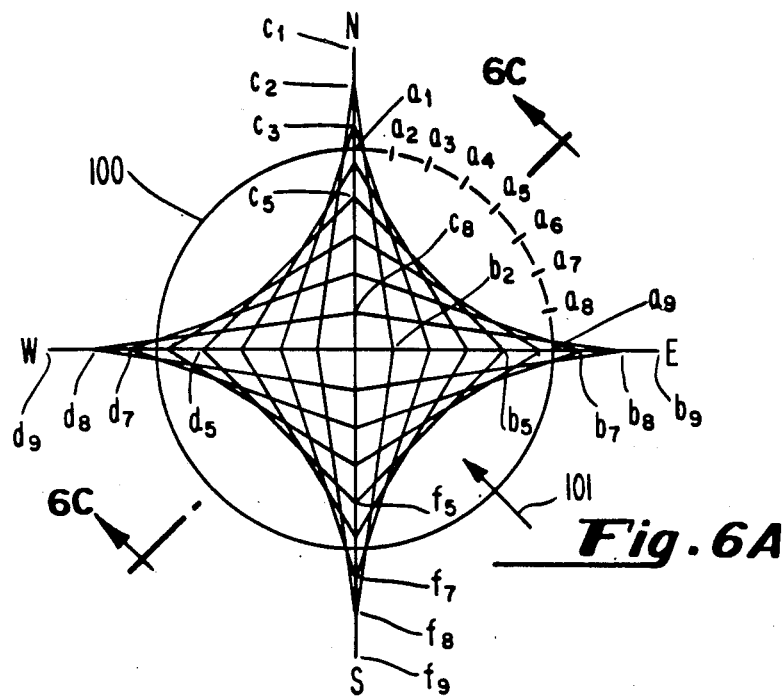
FIG. 6A is a diagram showing a geometric construction illustrating the shape of the cavity inside the flattened catalyst support.
Figure 6B:
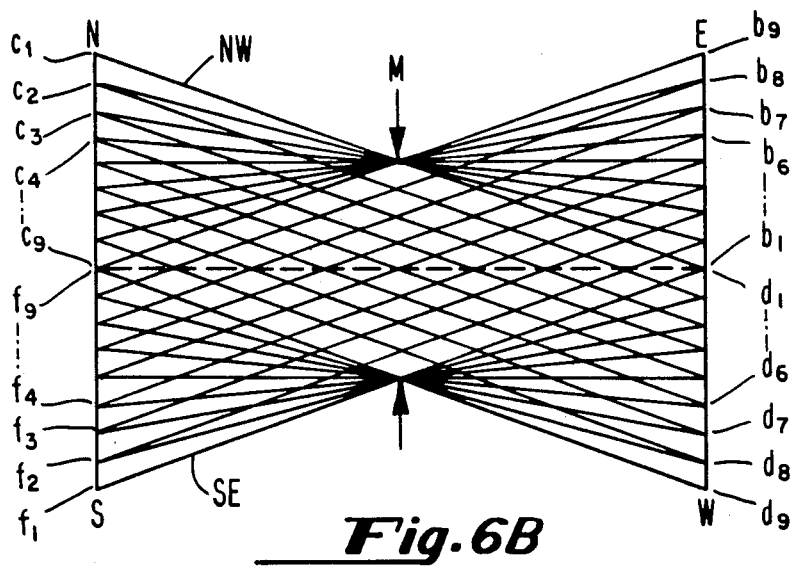
FIG. 6B is a view taken in the direction of arrow 101 in FIG. 6A, illustrating the hypothetical lines defining the surfaces of the cavity inside the flattened support.
Figure 6C:
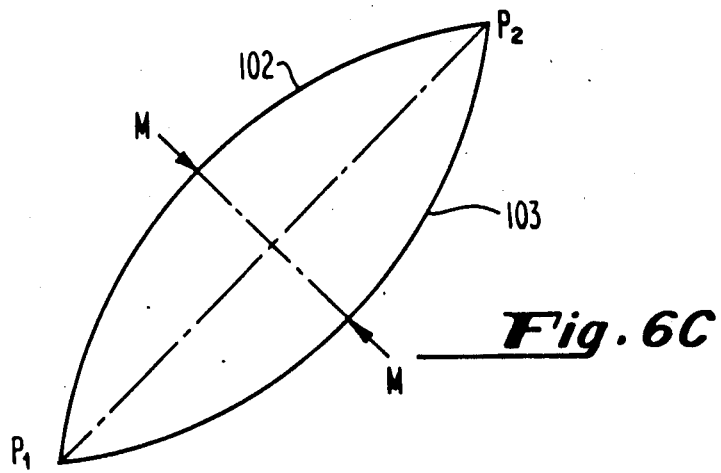
FIG. 6C is a cross sectional view, taken along the line 6C—6C of FIG. 6A.

In order to construct the tapered mandrel, it is necessary to understand the shape of the interior cavity of the flattened catalyst support. FIGS. 6A, 6B, and 6C are idealized geometrical drawings illustrating the shape of the cavity at the core of the flattened catalyst support. In these figures, the various directions are labeled as "north", "south", "east", and "west" (or N, S, E, and W), for convenience of explanation only.

In FIG. 6A, circle 100 represents the hole that has been flattened at both ends. After flattening, the near end of hole 100 forms the flat seam NS, and the far end forms the flat seam EW. The lines NS and EW have a length equal to π/2 times the diameter of circle 100 (FIG. 6A is thus not drawn entirely to scale). Although the lines NS and EW intersect in the two-dimensional drawing of FIG. 6A, it is apparent that these lines lie in distinct, parallel planes.

Points $a_1, a_2, \ldots a_g$, represent equidistant points along the edge of the axial hole. For convenience of illustration, only nine such points are shown; eventually, the number of points is allowed to approach infinity. It is understood that corresponding points $a_1, a_2, \ldots a_g$ are located on the far end of the axial hole. Now when the hole is compressed at the near end, circle 100 becomes flattened onto the line NS, and the points $a_i$ become superimposed on the points $c_1, c_2, \ldots c_g$, respectively. Similarly, when the hole is compressed at the far end, circle 100 is flattened onto the line EW, and the points $a_i$ become the points $b_i$, as shown.

It follows that the shape of the cavity within the compressed catalyst support can be defined by connecting the corresponding points on the lines NS and EW. Thus, point $c_1$ is connected to point $b_1$, point $c_2$ is connected to point $b_2$, etc. The same process is repeated for the other quadrants, except that there is no need to duplicate lines. Thus, in the example given, there would be 32 lines drawn. Points $d_i$ and $f_i$ are therefore also shown. If the arc length between adjacent points $a_i$ is allowed to approach zero, the number of points $a_i$ will approach infinity, and the number of lines drawn will also be infinite. This infinity of lines, in three dimensions, would then define the actual cavity within the catalyst support.

FIG. 6B shows the appearance of the set of lines of FIG. 6A, when viewed from the direction indicated by arrow 101. FIG. 6B illustrates the fact that the lines NS and EW are separated from each other by the length of the catalyst support. The points $b_i$, $c_i$, $d_i$, and $f_i$ are illustrated, except that it is understood that $b_1$ coincides with $d_1$, and $c_9$ coincides with $f_9$. Lines NS and EW are foreshortened in FIG. 6B by a factor of $(\frac{1}{2})\sqrt{2}$, due to the direction from which these lines are viewed. Lines NS and EW do not intersect, but lie in separate, parallel planes.

In FIG. 6A, a square, defined by the lines connecting the midpoints of the semi-axes, (i.e. $b_5$, $c_5$, $d_5$, and $f_5$) is plainly visible. This square indicates the cross section of the cavity at the center of the catalyst support, i.e. at the midpoint along the length of the cavity. If the support were flattened into two dimensions, then this square would in fact define the actual center of the support. The diagonals of the square are parallel to the lines NS and EW. The side of the square is the distance between arrows M—M of FIG. 6B.

FIG. 6C is a cross-sectional view taken through the cavity, on a plane that includes the line C—C, the plane being perpendicular to the plane of the paper.

The curves 102 and 103 in FIG. 6C can be constructed from FIG. 6A and can be shown to be parabolas. The construction is as follows. Draw the line indicated by C—C in FIG. 6A. Select one of the previously drawn lines, say $c_2b_2$, and let the point of intersection of this line with the line C—C be called P. The ratio of the distance from $c_2$ to P, to the distance from $c_2$ to $b_2$, times the distance between the ends of the support (i.e. the length of the dotted line in FIG. 6B), is the abscissa in FIG. 6C. In FIG. 6C, point $P_1$ is the origin, and the "horizontal" axis is the line $P_1P_2$. Next, measure the distance from the point of (apparent) intersection of the lines NS and EW in FIG. 6A, and point P. This distance is the corresponding ordinate in FIG. 6C.

It can be shown that, if A represents one half the length of the line NS, the equation of curve 102 in FIG. 6C is $$y = \sqrt{2A x(1-x)},$$

with the equation for curve 103 simply being the negative of this curve. The curves 102 and 103 are therefore parabolas. In the above equation, x ranges from 0 to 1, the abscissa being in units of the length of the support (the length of the dotted line in FIG. 6B). It is important to note that these curves are symmetric. The maximum difference between the ordinates of curves 102 and 103 is indicated by the line M—M, which has the length of the square discussed above.

In FIGS. 6A, 6B, and 6C, the shape of the cavity is exaggerated, showing a short and wide cavity. In practice, the cavity would be long and slim. Also, in FIG. 6A, the cavity was assumed to be generated by straight lines. This would require that the layers of metal foil immediately surrounding the central hole be compressible along their length and that they not bend at all across their length. Actually, the foil can bend somewhat across the length, despite the corrugations, but a flat strip cannot be compressed along its length without buckling. Therefore the shape generated in FIG. 6A is not meant to be exact. What FIG. 6A does show is that both the cavity and the mandrel that fits the cavity have a taper in both of two directions.

If the compression of the ends of the catalyst support is not performed in mutually perpendicular directions, then the shape of the cavity will deviate from the idealized construction discussed above. In particular, the cross-sectional shape of the cavity, at its center, will not be square. However, in general, there will be a cavity, and that cavity will taper towards both ends of the support.

Figure 7A:
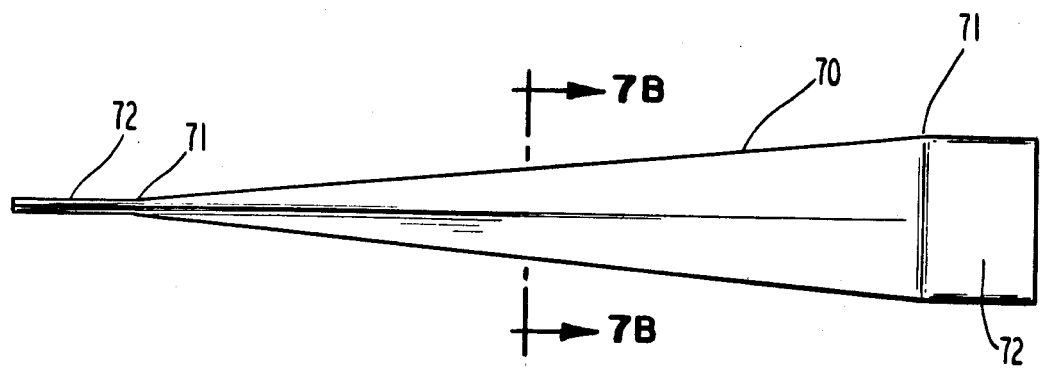
FIG. 7A is a side elevational view of the mandrel used to anchor the catalyst support of the present invention.

FIG. 7A is a side elevational view of a mandrel 70. The cross section at the center of the mandrel has a square shape, as shown in FIG. 7B. The square is flattened toward each end along alternate diagonals. The flattening is complete at points 71 so that there is a completely flattened length 72 at each end of the mandrel 70. Flat sections 72 are shown again in the end views, FIGS. 7C and 7D. The honeycomb that is to be flattened upon mandrel 70 will extend beyond the ends of the honeycomb. When a honeycomb is flattened on mandrel 70, the honeycomb and the mandrel are locked together. This is so because the mandrel itself has a taper in both of two directions, and the cavity within the honeycomb conforms to the mandrel. The mandrel 70 thus remains inside the final product. In addition to helping to anchor the support and prevent telescoping, the tapered mandrel, by occupying the space within the support, also performs the function of the packing material discussed above. When this tapered mandrel is used, the packing material is not needed.

If the shape of the cavity differs from that discussed above, so that the cross-section at its center is not a square, then the tapered mandrel would need to be constructed accordingly. What is important is that the tapered mandrel conform substantially to the shape of the cavity. It is also important that the honeycomb be flattened so that the flattened seams are aligned with the flattened length 72 on the mandrel.

It is preferred that the tapered mandrel be of tubular construction, to reduce the cost of materials. However, any solid material, capable of withstanding the high temperatures present in the catalyst support, can be used.

Figure 8:
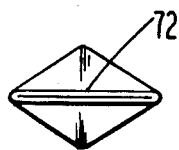
FIG. 8 is an end view showing a catalyst support of the present invention, inserted within a tube.
Figure 8:
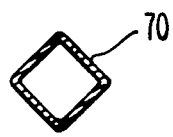
Figure 8:
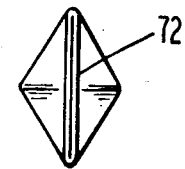
Figure 8:
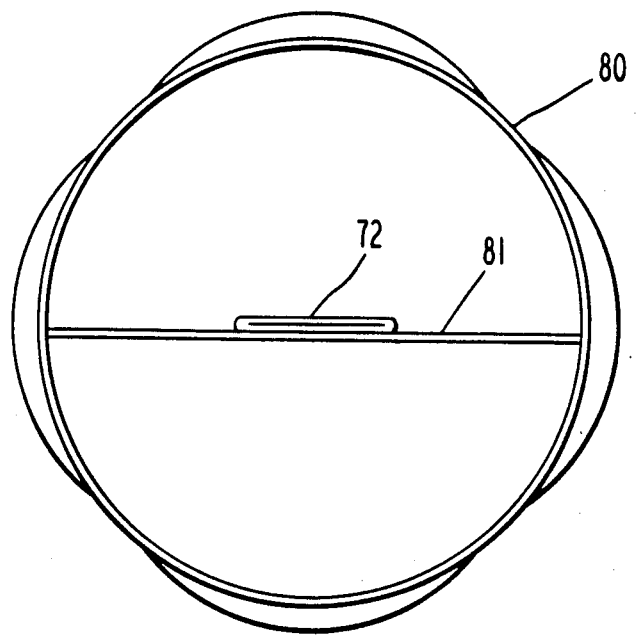

FIG. 8 is an end view of a honeycomb within a tube. Tube 80 has been flattened in both of two directions by the method shown in FIG. 5. The honeycomb has been flattened on the mandrel of FIG. 7A, and the mandrel itself has a taper in both of two directions. The flattened end 72 extends beyond the honeycomb and is visible in FIG. 8. Cross member 81 is welded to flattened end section 72, and also to tube 80. A similar construction can exist at the other end of tube 80. Now the honeycomb is anchored in tube 80 by the taper in both of two directions in tube 80 and by the taper in both of two directions on mandrel 70.

The objects of the invention are clearly fulfilled by the above disclosure. It is understood that the invention can be modified in various ways, without departing from the spirit of the disclosure. As stated above, the support which is flattened at two ends may be flattened in directions which are not mutually perpendicular. The original honeycomb need not be circular. One could start with an ellipse or a racetrack, for example. These and other modifications are to be deemed within the spirit and scope of the following claims.

What is claimed is:

1. Apparatus for shaping a honeycomb catalyst support, the support being contained in a tube, the support including at least one strip of metal which is spirally wound on a generally cylindrical core to form a cylindrical catalyst support, the support and the tube having two ends of generally circular shape, the tube protruding beyond the ends of the support, the apparatus comprising:
   (a) two cylindrical mandrels, the cylindrical mandrels both having a diameter which permits the mandrels to be inserted into the ends of the tube,
   (b) two pairs of plates, the plates being disposed at 90° intervals around the circumference of the tube, and between the ends of the tube, the plates being movable towards each other at one end of the tube and away from each other at the other end of the tube, such that movement of the plates towards the tube compresses the tube and the catalyst support contained therein, each plate having a curved lip at one end, and
   (c) means for moving the plates towards and away from the tube while holding the mandrels within the ends of the tube, wherein the moving means is configured such that the plates of the first pair move towards each other at the first end of the tube, while the plates of the second pair move away from each other at the first end of the tube, and wherein the plates of the second pair move towards each other at the second end of the tube, while the plates of the first pair move away from each other at the second end of the tube.

2. Apparatus for shaping a honeycomb catalyst support, the support being contained in a tube, the support including at least one strip of metal which is spirally wound on a generally cylindrical core to form a cylindrical catalyst support, the support and the tube having two ends of generally circular shape, the tube protruding beyond at least one end of the support, the apparatus comprising:
   (a) at least one cylindrical mandrel, having a diameter which permits the mandrel to be inserted into one of the ends of the tube,
   (b) two pairs of plates, the plates of both pairs being disposed at diametrically opposite sides of the tube, and between the ends of the tube, the plates being movable towards each other at one end of the tube and away from each other at the other end of the tube, such that movement of the plates towards the tube compresses the tube and the catalyst support contained therein, and
   (c) means for moving the plates towards and away from the tube while holding the mandrel in the end of the tube, wherein the moving means is configured such that the plates of the first pair move towards each other at the first end of the tube, while the plates of the second pair move away from each other at the first end of the tube, and wherein the plates of the second pair move towards each other at the second end of the tube, while the plates of the first pair move away from each other at the second end of the tube.

3. The apparatus of claim 2, wherein the plates are disposed at 90° intervals around the circumference of the tube.

4. The apparatus of claim 3, wherein there are two cylindrical mandrels, the cylindrical mandrels both being insertable into both ends of the tube.

5. The apparatus of claim 4, wherein the plates have a curved lip at one end.

6. Apparatus for shaping a honeycomb catalyst support, the support being contained in a tube, the support including at least one strip of metal which is spirally wound on a generally cylindrical core to form a cylindrical catalyst support, the tube and the support having two ends of generally circular shape, the apparatus comprising two pairs of plates, the plates of both pairs being disposed at diametrically opposite sides of the tube, and between the ends of the tube, the plates being movable towards each other at one end of the tube and away from each other at the other end of the tube, such that movement of the plates towards the tube compresses the tube and the catalyst support contained therein, and means for moving the plates towards and away from the tube, wherein the moving means is configured such that the plates of the first pair move towards each other at the first end of the tube, while the plates of the second pair move away from each other at the first end of the tube, and wherein the plates of the second pair move towards each other at the second end of the tube, while the plates of the first pair move away from each other at the second end of the tube.

7. The apparatus of claim 6, further comprising means for maintaining the generally circular shape of the ends of the tube while the moving means are compressing the tube.

* * * * *